United States Patent
Franz et al.

(10) Patent No.: US 8,490,391 B2
(45) Date of Patent: Jul. 23, 2013

(54) HYDROSTATIC CLUTCH ACTUATOR

(75) Inventors: Viktor Franz, Karlsruhe (DE); Matthias Ehrlich, Buehl (DE); Norbert Esly, Buehl (DE)

(73) Assignee: Schaeffler Technologies AG & Co. KG, Herzogenaurach (DE)

(*) Notice: Subject to any disclaimer, the term of this patent is extended or adjusted under 35 U.S.C. 154(b) by 0 days.

(21) Appl. No.: 13/457,822

(22) Filed: Apr. 27, 2012

(65) Prior Publication Data

US 2012/0241281 A1 Sep. 27, 2012

Related U.S. Application Data

(63) Continuation of application No. PCT/DE2010/001185, filed on Oct. 7, 2010.

(30) Foreign Application Priority Data

Oct. 29, 2009 (DE) .......................... 10 2009 051 245

(51) Int. Cl.
*B60K 23/00* (2006.01)
*F15B 7/02* (2006.01)

(52) U.S. Cl.
USPC .............................................. 60/534; 60/545

(58) Field of Classification Search
USPC .................................................. 60/534, 545
See application file for complete search history.

(56) References Cited

U.S. PATENT DOCUMENTS

| | | | | |
|---|---|---|---|---|
| 3,406,584 A * | 10/1968 | Roantree | .................... | 74/424.92 |
| 4,926,708 A * | 5/1990 | Dietrich et al. | ............ | 74/424.75 |
| 5,557,154 A * | 9/1996 | Erhart | .............................. | 310/80 |
| 6,230,492 B1 * | 5/2001 | Kingston et al. | ................ | 60/545 |
| 6,935,111 B2 * | 8/2005 | Dantlgraber | .................... | 60/545 |
| 7,703,348 B2 * | 4/2010 | Reisch et al. | .............. | 74/473.11 |
| 2002/0006846 A1 * | 1/2002 | Gallo | ............................ | 475/333 |
| 2005/0168084 A1 * | 8/2005 | Tesar | ............................... | 310/80 |
| 2006/0245954 A1 * | 11/2006 | Wiechmann | .................. | 417/415 |

FOREIGN PATENT DOCUMENTS

| | | |
|---|---|---|
| DE | 19700935 | 8/1997 |
| DE | 102006014866 | 10/2006 |
| DE | 102005058776 | 7/2007 |
| EP | 0320621 | 6/1989 |
| EP | 1712789 | 10/2006 |
| EP | 1908990 | 4/2008 |

* cited by examiner

*Primary Examiner* — Thomas E Lazo
(74) *Attorney, Agent, or Firm* — Simpson & Simpson, PLLC

(57) ABSTRACT

The invention relates to a hydrostatic actuator, having a master cylinder including a housing and a piston, which is axially mountable in the housing and which pressurizes a pressure chamber filled with pressure medium, a planetary rolling-contact gear system that converts a rotary drive into an axial motion and that has a sleeve, a gear-driven spindle, and planetary rolling elements that roll therebetween, and an electric motor that drives the planetary rolling-contact gear system and that has a stator rigidly connected to a housing and a rotor that can be rotated relative to the stator. In order to optimize the installation space, the pressure chamber is annular and the planetary rolling-contact gear system is arranged radially within the pressure chamber.

12 Claims, 4 Drawing Sheets

HYDROSTATIC CLUTCH ACTUATOR

CROSS-REFERENCE TO RELATED APPLICATIONS

This application is filed under 35 U.S.C. §120 and §365(c) as a continuation of International Patent Application No. PCT/DE2010/001185 filed Oct. 7, 2010, which application claims priority from German Patent Application No. 10 2009 051 245.4 filed Oct. 29, 2009, which applications are incorporated herein by reference in their entireties.

FIELD OF THE INVENTION

The invention broadly relates to a hydrostatic actuator with a master cylinder that includes a housing and a piston that is axially displaceable in the housing and applies pressure to a pressure chamber filled with a pressure fluid, with a planetary rolling-contact gear system converting a rotary drive into an axial movement and including a sleeve, a gear spindle and planetary rolling bodies rolling off therebetween, and with an electric motor, including a stator, that is fixed to the housing and a rotor that is rotatable relative to the stator.

BACKGROUND OF THE INVENTION

A hydrostatic actuator of this type is known from German Patent No. 197 00 935 A1. In accordance with this document, a piston of a master cylinder is driven by an electric motor and the rotary movement of the electric motor is converted into an axial movement by a gearing mechanism in the form of a worm drive. The piston is driven by an eccentric pin arranged on the worm gear.

In addition, European Patent No. 0 320 621 A1 discloses a planetary rolling-contact gear system that includes a threaded spindle, a sleeve arranged coaxially with the threaded spindle, and planetary gears rolling off between the two. The planetary gearing mechanism is driven to rotate by an electric motor and converts a fast rotary movement into a slower axial movement.

Thus, there is a long-felt need for a hydrostatic actuator that is preferably used in a motor vehicle and has an increased efficiency, reduced required installation space, and increased operating pressure of the master cylinder.

BRIEF SUMMARY OF THE INVENTION

An object of the invention is attained by a hydrostatic actuator having a master cylinder with a housing and with a piston that is axially movable in the housing and applies pressure to a pressure chamber that is filled with a pressure fluid, a planetary rolling-contact gear system converting a rotary drive into an axial movement and including a sleeve, a gear spindle, and planetary rolling bodies rolling off therebetween, as well as an electric motor driving the planetary rolling-contact gear system and including a stator that is fixed to the housing and a rotor that is rotatable relative to the stator, where the pressure chamber is annularly shaped and the planetary rolling-contact gear system is arranged radially inside the pressure chamber. The result is a design that is axially shortened. Alternatively, the planetary rolling-contact gear system may be arranged in the rotor of the electric motor. Compared to this alternative arrangement, an advantage of the arrangement of the planetary rolling-contact gear system radially inside the pressure chamber, as suggested herein, is that this arrangement provides a hydrostatic actuator with a small diameter. The reason for this is that the alternative nestled arrangement, including the rotor and the planetary rolling-contact gear system, requires more installation space than the nestled arrangement of the planetary rolling-contact gear system and the master cylinder, as suggested herein, for example, if the sleeve of the planetary rolling-contact gear system essentially corresponds to the stroke of the piston.

Moreover, the electric motor and the planetary rolling-contact gear system are preferably arranged coaxially and at a distance from each other. Thus, the diameter of the electric motor can be adapted to be the same as or smaller than the diameter of the master cylinder. If the sleeve is arranged radially inside the annular pressure chamber, the interior space available to the rotor may be small, and with a predetermined diameter, the electric motor may be comparatively powerful. Since the surface portion of the pressure chamber arranged radially on the outside of the housing of the master cylinder is only slightly smaller compared to a total surface with only a small surface portion that is radially on the inside, the installation space located radially inside the pressure chamber may be used for the sleeve.

The hydrostatic actuator is suitable for use as a master controlled by a control unit to provide a pre-determinable pressure via a pressure port in the pressure chamber and via a pressure line to a slave for axial displacement of components such as a slave cylinder of an opened or closed friction clutch arranged, for instance, between a combustion engine and a gearing mechanism in the drive train of a motor vehicle, a selector shaft or selector roller arranged in a gearing mechanism to shift gears, a brake cylinder for operating brakes, and the like.

In one embodiment, the housing of the master cylinder and the housing of the electric motor may be of one-piece construction, for instance, made of aluminum or other light metal or alloy thereof in a casting process such as die casting, or of plastic in an injection molding process. Due to the one-piece construction of the housings, the number of parts is reduced and the stability of the two housings with the piston supported on the housing between the master cylinder and the electric motor is increased when the pressure chamber is pressurized.

In this context, it is preferable that a pressure fluid reservoir is integrated into the hydrostatic actuator without increasing the required installation space to any significant extent. The reservoir may contain a pressure fluid supply that may be exchanged in the relaxed state of the piston when a loss of pressure fluid occurs in the hydraulic system between the master cylinder, pressure line and slave cylinder, or when temperature fluctuations occur between the pressure chamber and the reservoir. For instance, with a predetermined diameter of the electric motor, the diameter of the master cylinder may be matched with the diameter of the electric motor, the reservoir being provided in an annular space radially outside the pressure chamber. In this context, the annular space may be intersected by a hollow cylinder that is located along the axis of rotation and may include a connection to a separate and/or further reservoir for instance in the case of an unfavorable inclination of the hydrostatic actuator upon its installation in a motor vehicle or a bellows to equalize pressure with the environment in order to even out pressure differences between the reservoir, and thus, the pressure chamber in the unpressurized state and the environment.

In another embodiment with the sleeve of the planetary rolling-contact gear system axially spaced apart from the electric motor, the sleeve may be fixed to the housing so as to be fixed against rotation and axially displaceable and the piston may be driven by the sleeve. The sleeve may be arranged longitudinally in the housing and connected to the piston to be rotationally fixed. As a consequence, the gear spindle, which requires a considerable amount of installation space in the axial direction, is driven by the electric motor and remains axially fixed in position so that it may, for instance, be extended over the entire axial installation space and may be supported and axially fixed on both end faces of the hydrostatic actuator. The length of the hydrostatic actuator may be adapted to the threaded spindle without stroke. The stroke of the sleeve is identical with the stroke of the piston, which means that the axial displacement of the sleeve does not increase the required axial installation space. Thus, the present invention provides a space-saving hydrostatic actuator.

In order to be able to design the electric motor as an electronically commutated motor on the one hand and to monitor the rotary movement of the gear spindle on the other hand, a sensor device is provided in the hydrostatic actuator to at least sense a rotary movement of the gear spindle. The sensor device may include Hall effect sensors that detect an analogous angle or increment sensors that detect the number of magnetic pulses over an angle of rotation of the gear spindle and determine the angle from the number of detected magnetic pulses. Suitable measures may be taken to calibrate the incremental sensors to a defined reference point such as the angular difference, for example, a stop that is detected by the control device may be provided. The Hall effect sensors are formed by a sensor part that is preferably fixed to the housing to provide better wiring options, and by one or more sensing magnets that are arranged on the movable component. In this way, sufficient angular resolutions of the angle of rotation of the gear spindle are possible in accordance with the number of sensing magnets distributed along the circumference of the gear spindle, i.e., of magnet segments formed thereof generating magnetic pulses.

For reasons of the electric or electronic susceptibility, it is preferable that at least one sensor for detecting operating data of the hydrostatic actuator is arranged on a circuit board of the local electronics. The circuit board may be arranged directly in an optimum position of the sensor or, if there is no such space available in this region, a non-electronic variable to detect the signal such as a mechanical or intrinsic physical variable may be fed to the region of the positioned circuit board.

As an alternative or in addition to the detection of the angle of rotation of the gear spindle, the detection of the stoke of the sleeve or piston by means of a Hall effect sensor is preferable. For this purpose, a suitable sensor may be provided directly in the region between the housing and piston or sleeve, with the wires leading to a local electronics for signal conversion potentially provided in the housing, or leading out of the housing. If the local electronics is remote in particular due to a lack of installation space, for example, for reasons of lower electromagnetic susceptibility of such a sensor, it is preferable for the sensor to be arranged close to or on the local electronics and for the movement of the piston or sleeve to be transmitted to the sensor by means of a rod. Potential slip of the planetary rolling-contact gear system may be determined and compensated for in particular from sensed signals of the angle of rotation of the gear spindle and from the axial displacement of the piston.

Alternatively or redundantly, the effect of the piston on the pressure chamber may be detected by sensing the pressure in the pressure chamber by means of a pressure sensor. To be able to determine the pressure directly by means of a pressure sensor arranged on a circuit board belonging to a local electronics and removed in space from the pressure chamber, a connecting bore that extends as far as the local electronics may be provided on the pressure chamber in the housing, for example, in a one-piece housing of the master cylinder and the electric motor. In terms of the invention, the local electronics may be provided on the side of the housing of the electric motor that faces away from the master cylinder, or in a non-required free space of the housing(s) of the hydrostatic actuator. The local electronics may be arranged in the region of or inside a cover that closes off the housing of the electric motor towards the outside once the electric motor and the components that are mounted from this side have been installed. A plug-in connection to the control device may be provided in the cover or in the housing.

BRIEF DESCRIPTION OF THE DRAWINGS

The nature and mode of operation of the present invention will now be more fully described in the following detailed description of the invention taken with the accompanying drawing figures, in which.

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and, as such, may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the preferred methods, devices, and materials are now described.

Figure 1:
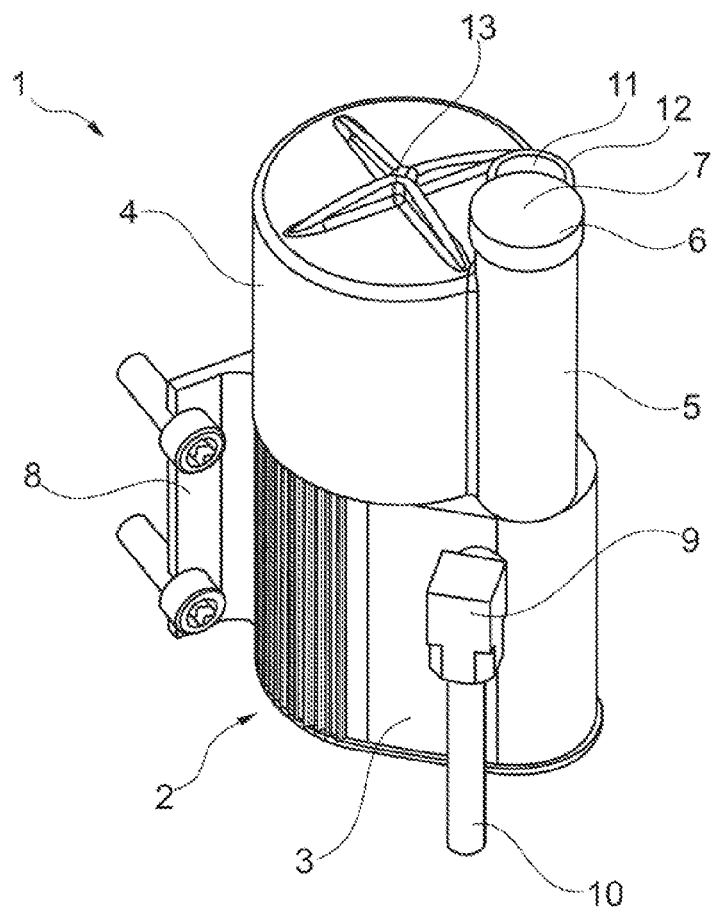
FIG. 1 illustrates the hydrostatic actuator of the invention.

FIG. 1 is a three-dimensional view of the hydrostatic actuator including one-piece housing 3 formed by the housing of electric motor 2 and the housing of the master cylinder, and housing portion 4 including reservoir dome 5 that is closed by covering cap 6, which has pressure compensation opening 7. Installation opening 12, which is closed by further covering cap 11, is used to install components and to test the functioning, for example, of the sensors of hydrostatic actuator 1.

Mounting 8 to fix hydrostatic actuator 1 to a component that is fixed to a frame, for instance, a firewall of a motor vehicle is provided on housing 3. In addition, pressure port 9 of pressure line 10 that provides a connection to a non-illustrated slave cylinder is fixed to housing 3, for instance, as a quick-acting coupling. Pressure port 9 is connected to the pressure chamber of the master cylinder. On the inside of the housing portion, there is a bearing to receive the gear spindle.

On the outside, the housing portion is reinforced by reinforcement ribs 13. In one embodiment, housing portion 4 may be made of light metal such as aluminum and alloys thereof or of plastic, for instance, in a die casting or injection molding process.

Figure 2:
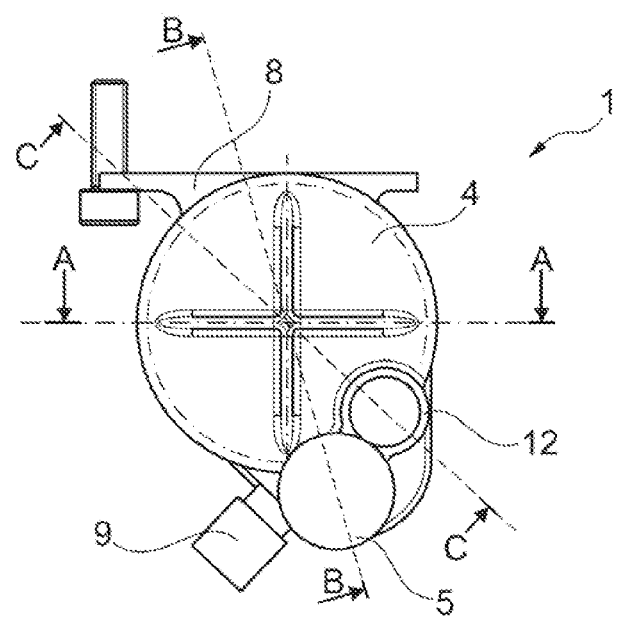
FIG. 2 is an elevational view of the hydrostatic actuator shown in FIG. 1.

FIG. 2 is an elevational view of the hydrostatic actuator of FIG. 1, including housing portion 4 with reservoir dome 5 and installation opening 12 as well as mounting 8 fixed to housing 3 (shown in FIG. 1) and pressure port 9. Section lines A-A, B-B, and C-C represent the cut surfaces of the sectional views of the hydrostatic actuator illustrated in FIGS. 3, 4, and 5.

Figure 3:
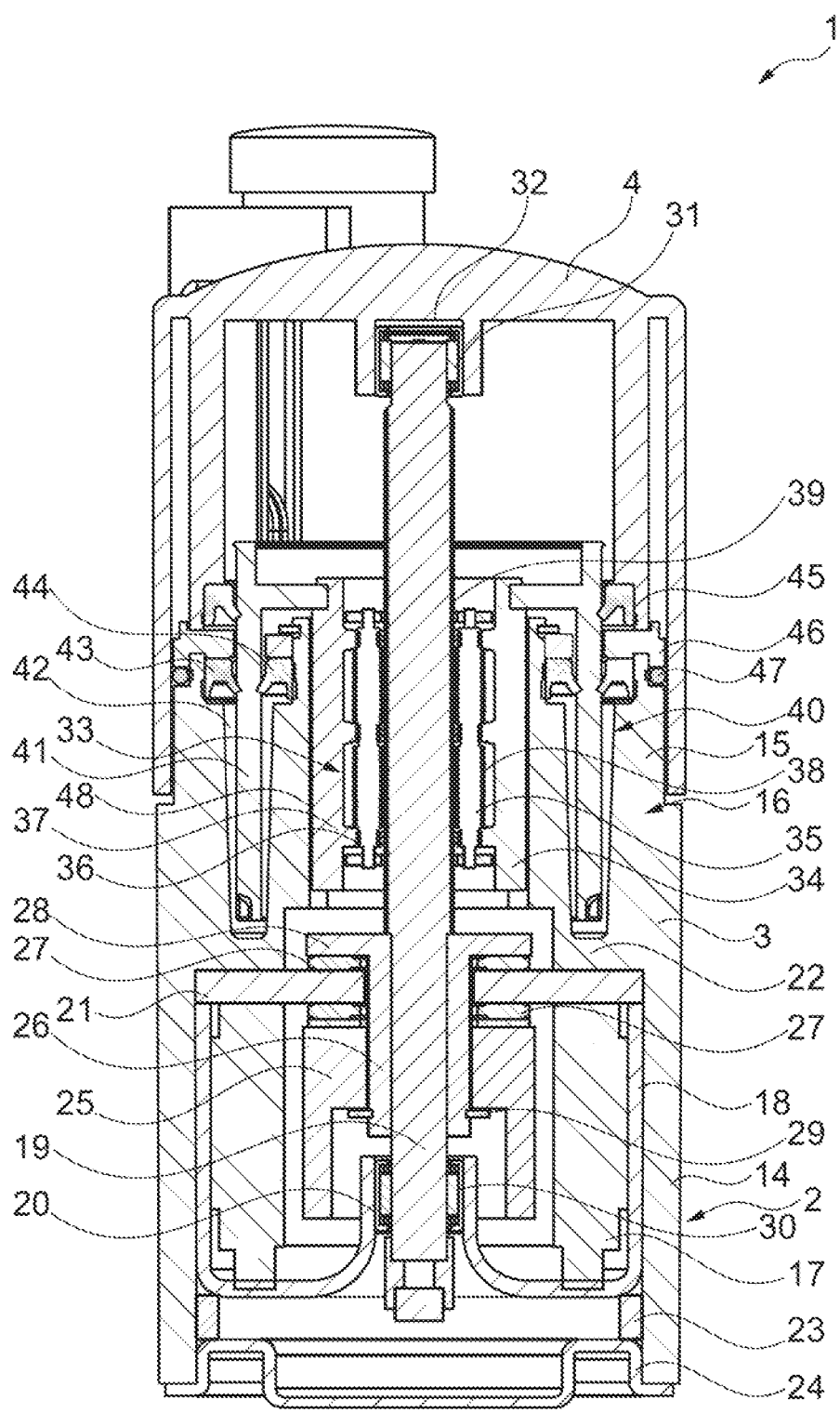
FIG. 3 is a cross-sectional view taken along line A-A of the hydrostatic actuator shown in FIG. 2.

FIG. 3 is a cross-sectional view of hydrostatic actuator 1 taken along section line A-A of FIG. 2, showing one-piece housing 3 formed by housing 14 of electric motor 2 and housing 15 of master cylinder 16, and housing portion 4 that is fixed to housing 3, for example, by screwing, pressing or welding.

Stator 17 of the electric motor is received radially inside on centering sleeve 18, which acts to center and support gear spindle 19 by means of the integrally formed axial bearing dome 20. Stator 17 is axially locked between bearing disc 21 and centering sleeve 18 and fixed against rotation in centering sleeve 18. Centering sleeve 18 axially fixes bearing disc 21 to stop 22 of housing 3 and is axially fixed itself by means of stop disc 23 and cover 24 that is connected, for instance, screwed to housing 3.

Rotor 25, which is arranged radially inside stator 17, is received radially inside on bearing sleeve 26 to be axially fixed and centered thereon. Bearing sleeve 26 is received for rotation in an axially fixed manner by means of bearing disc 21. For this purpose, axial bearings 27, for example needle bearings, are arranged on both sides of bearing disc 21. Axial bearings 27 form a bearing seat with annular rim 28 of bearing sleeve 26, on the one hand, and with rotor 25 that is axially fixed on bearing sleeve 26 by means of securing disc 29, on the other hand. Bearing sleeve 26 is connected to gear spindle 19 to be fixed against rotation relative to the latter, for instance, shrink-fitted so that axial centering of bearing sleeve 26, and thus, of rotor 25 is achieved by means of radial bearing 30 via centering sleeve 18 on housing 3 and axial support of gear spindle 19 on the housing is achieved via bearing disc 21. Gear spindle 19 is additionally supported by radial bearing 31 in bearing dome 32 of housing portion 4.

Planetary rolling-contact gear system 33 formed by gear spindle 19, sleeve 34, and planetary rolling bodies 35 rolling off therebetween is arranged to be axially spaced apart from electric motor 2. To convert the rotary movement of threaded spindle 19, which is driven to rotate by rotor 25, into an axial movement of sleeve 34, the planetary rolling bodies have toothing 36, which meshes with coarse toothing 37 of sleeve 34, and with fine-pitch thread 38, which meshes with exterior thread 39 of the gear sleeve.

Master cylinder 40 is arranged radially outside planetary rolling-contact gear system 33 and includes piston 41, which is moved in the axial direction by sleeve 34, and pressure chamber 42, which is equipped with pressure port 9 (shown in FIG. 1). Piston 41 and pressure chamber 42 are arranged annularly around sleeve 34. Pressure chamber 42 is sealed by grooved ring seals 43, 44 arranged between piston 41 and housing 15. Further grooved ring seal 45 seals piston 41 towards the interior of housing portion 4. Spacer ring 46 is provided between two grooved ring seals 43, 44. Housing portion 4 is sealed towards housing 15 by means of annular seal 47.

In one embodiment, master cylinder 40 is shown in the fully operated condition, i.e., piston 41 is moved towards electric motor 2 to build up pressure and is thus in a position that corresponds to the extended position of piston 41. Thus, a circuit of forces is created outside the electric motor and operation essentially free of axial forces can be achieved. The axial force exerted by planetary rolling-contact gear system 33 to move piston 41 is supported by bearing disc 21 on housing 3. The pressure exerted by the piston 41 onto the pressure chamber 42 is likewise introduced into housing 3 so that a short low-elasticity circuit of forces is formed.

To prevent the sleeve from rotating as a result of drag and friction torques, sleeve 34 is received and guided in housing 15 in a manner to be fixed against rotation. For this purpose, longitudinal guide 48 is provided between sleeve 34 and housing 15. Longitudinal guide 48 may be formed by one or more longitudinal grooves that are distributed in the circumferential direction and into which complementary longitudinal springs engage in the radial direction. To improve in particular the tribologic behavior of grooved ring seals 43, 44, the longitudinal guide may be slightly helical. For instance, it may have a small angular proportion of a few degrees in the circumferential direction.

Stator 17, rotor 25, and planetary rolling-contact gear system 33 may form an assembly unit that is inserted into housing 3 from one side. Subsequently, the housing may be closed on this side by means of cover 24. Master cylinder 40 is installed from the other side, with piston 41 being connected to the sleeve at least in an axially fixed manner, for instance caulked, locked, or suspended therein.

Figure 4:
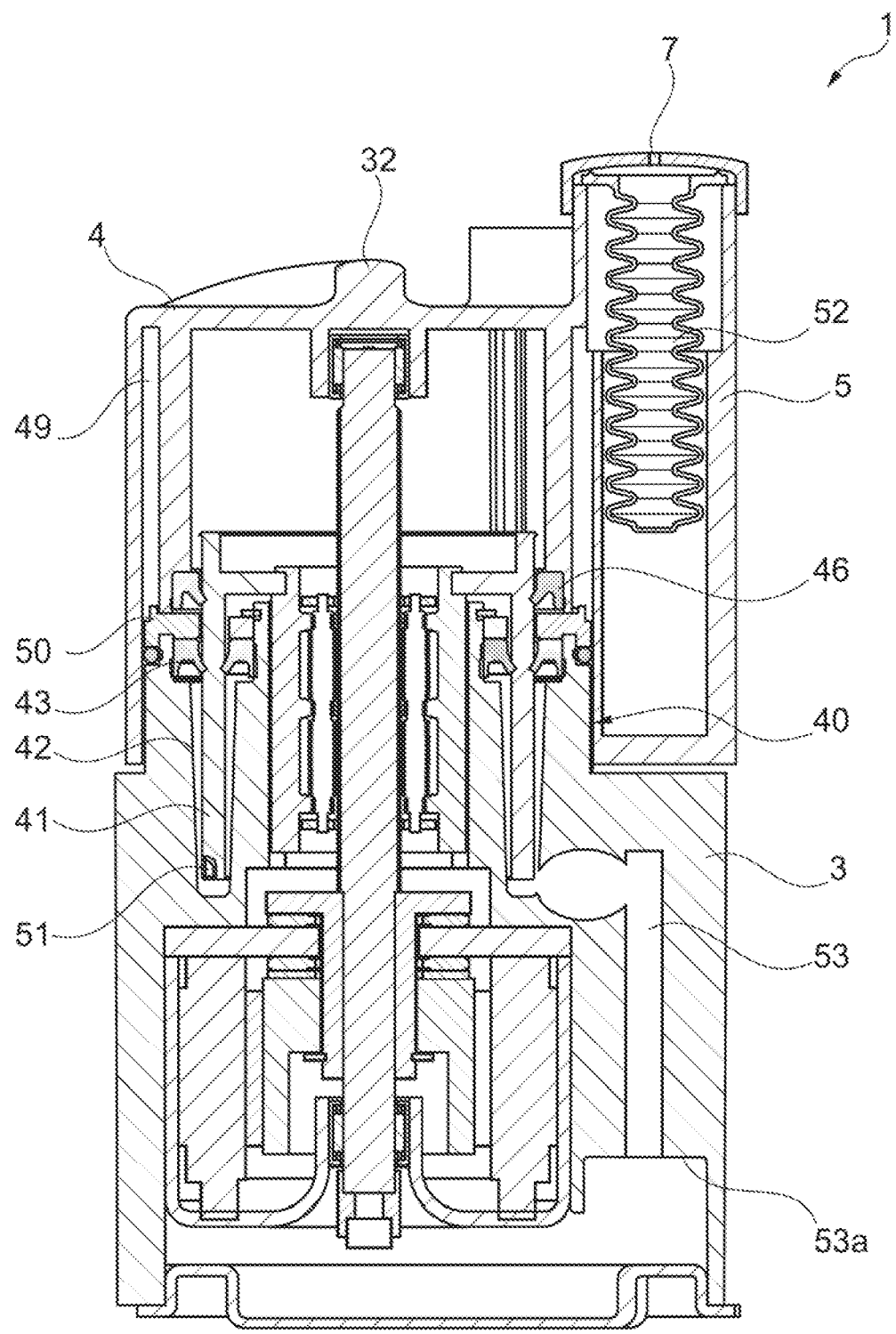
FIG. 4 is a cross-sectional view taken along line B-B of the hydrostatic actuator shown in FIG. 2; and, FIG. 5 is a cross-sectional view taken along line C-C oldie hydrostatic actuator shown in FIG. 2.

FIG. 4 is a cross-sectional view of hydrostatic actuator 1 taken along line B-B in FIG. 2. This view illustrates the arrangement of reservoir 49 for the operation of the hydraulic system into which hydrostatic actuator 1 is integrated due to pressure chamber 42. Reservoir 49 extends radially outside pressure chamber 42 in housing portion 4 and is delimited by spacer ring 46. A volume exchange between reservoir 49 and pressure chamber 42 occurs with piston 41 (shown here in the fully operated condition) in the resting position. In the resting position, piston 41 is moved radially towards bearing dome 32 far enough for it to pass grooved ring seal 43. Thus, reservoir 49 is connected to pressure chamber 42 by means of one or more channels 50 provided in spacer ring 46. Compensation grooves 51 may be provided in piston 41 to improve control of the transition between closed and open connection.

Reservoir dome 5 is connected to reservoir 49 in a non-illustrated location by means of openings, for example. Reservoir dome 5 includes bellows 52, which is connected to reservoir 49 on one side and to the environment on the other side via pressure compensation opening 7 to even out a pressure difference between reservoir 49 and the environment.

The cross-sectional view of FIG. 4 further indicates axial extension 53 of pressure chamber 42 in housing 3. Axial extension 53 extends as far as the end face shoulder 53a, at which a non-illustrated local electronics is positioned. Thus, extension 53 is directly fed to a pressure sensor for detecting the operating pressure of pressure chamber 42, and thus, of master cylinder 40. The pressure sensor is provided on a circuit board of the local electronics and may be used without electric lines.

Figure 5:
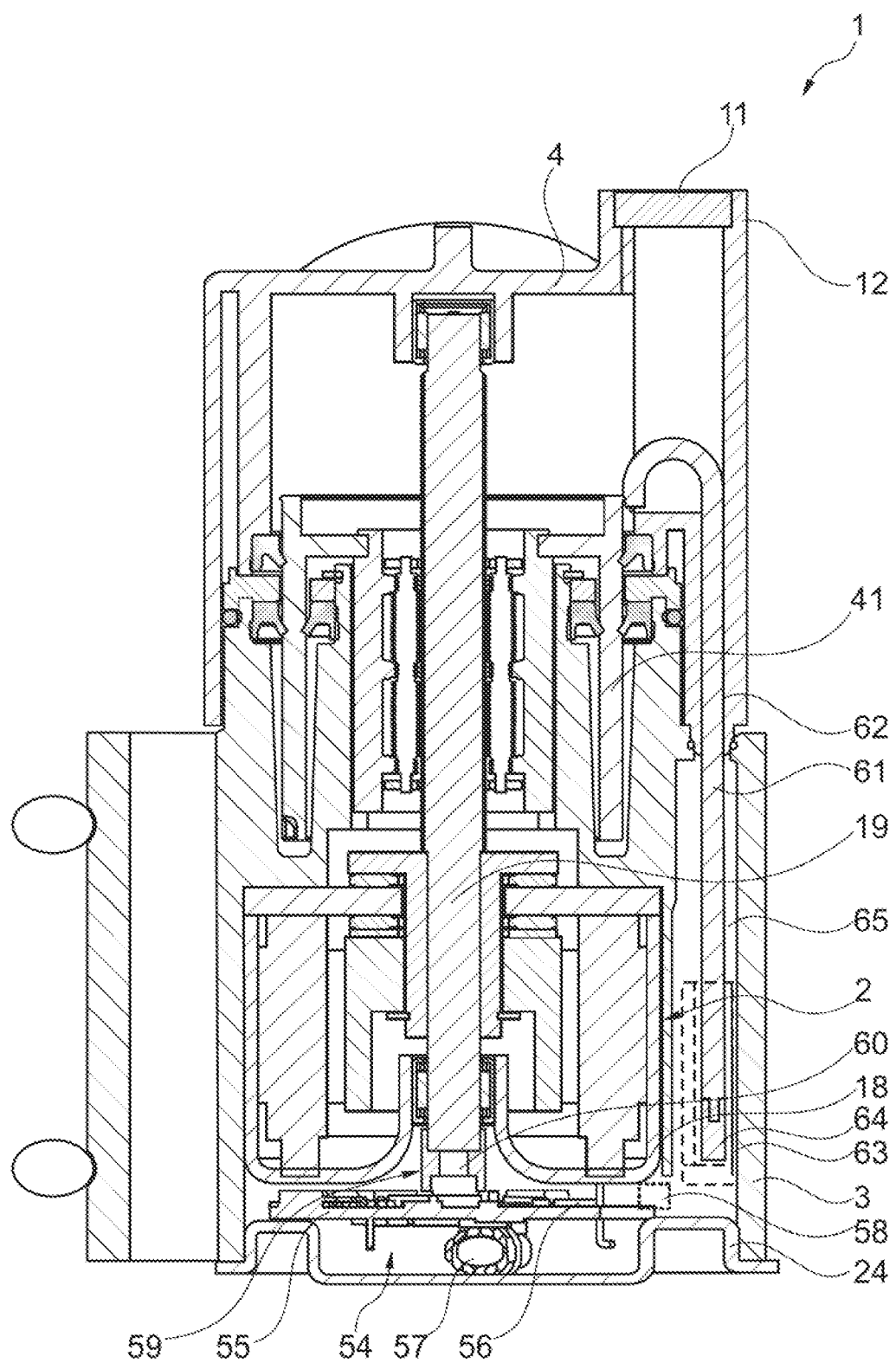

FIG. 5 is a cross-sectional view of hydrostatic actuator 1 taken along line C-C of FIG. 2. This view is towards the sensor device 54, which may be arranged on local electronics 55, which is formed by at least electronic circuit board 56 on which the necessary electronic components are provided for controlling electric motor 2 and supplying it with energy and for processing and/or transmitting the measurement signals sensed by the sensors. Local electronics 55 includes connector 57 which may be guided through housing 3 or cover 24 and includes signal and supply lines and is connected to an external control device. Local electronics 55 is arranged and fixed between the centering sleeve 18 and the cover 24.

In one embodiment, all sensors for controlling the hydrostatic actuator are positioned in a central position on circuit board 56 without a connecting line. For this purpose, pressure sensor 58 is received on circuit board 56. Pressure sensor 58 detects the pressure at extension 53, such as the connecting bore of FIG. 4, and seals the extension. In addition, sensor 59 for sensing the angle or rotation of gear spindle 19 is arranged on circuit board 56. Sensor 53 may be a Hall effect sensor, with associated sensing magnet 60 arranged on gear spindle 19. To detect the axial path of piston 41, rod 61 is connected to piston 41, for instance, suspended or locked therein. Rod 61 is axially guided in guide 62 of housing portion 4 and is guided as far as circuit board 56. Thus, axial path sensor 63, which is only diagrammatically indicated here and is received on circuit board 56 and extends into clearance 65 formed in housing 3 detects the axial path of piston 41 at a spatial and axial distance thereto. Axial path sensor 63 is preferably a Hall effect sensor that detects the axial path depending on the distance of sensing magnet 64 mounted on rod 61. Installation opening 12 closable by covering cap 11 is provided in housing portion 4 for the purpose of mounting rod 61 and testing the functioning of axial path sensor 63.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

LIST OF REFERENCE SYMBOLS

1 hydrostatic actuator
2 electric motor
3 housing
4 housing portion
5 reservoir dome
6 covering cap
7 pressure compensation opening
8 mounting
9 pressure port
10 pressure line
11 covering cap
12 installation opening
13 reinforcement rib
14 housing
15 housing
16 master cylinder
17 stator
18 centering sleeve
19 gear spindle
20 bearing dome
21 bearing disc
22 stop
23 stop disc.
24 cover
25 rotor
26 bearing sleeve
27 axial bearing
28 annular rim
29 securing disc
30 radial bearing
31 radial bearing
32 bearing dome
33 planetary rolling-contact gear system
34 sleeve
35 planetary rolling body
36 toothing
37 toothing
38 fine-pitch thread
39 exterior thread
40 master cylinder
41 piston
42 pressure chamber
43 grooved ring seal
44 grooved ring seal
45 grooved ring seal
46 spacer ring
47 annular seal
48 longitudinal guide
49 reservoir
50 channel
51 compensation groove
52 bellows
53 extension
53a shoulder
54 sensor device
55 local electronics
56 circuit board
57 connector
58 pressure sensor
59 angle of rotation sensor
60 sensing magnet
61 rod
62 guide
63 axial path sensor
64 sensing magnet
65 clearance
A-A section line
B-B section line
C-C section line

What is claimed is:

1. A hydrostatic actuator comprising:
   a master cylinder, including a housing and a piston, wherein the piston is axially displaceable in the housing and applies pressure to a pressure chamber filled with a pressure fluid;
   a planetary rolling-contact gear system converting a rotary drive into an axial movement, wherein the planetary rolling-contact gear system comprises a sleeve, a gear spindle, and at least one planetary rolling body rolling off therebetween; and,
   an electric motor driving the planetary rolling-contact gear system, wherein the electric motor comprises a stator fixed to the housing and a rotor rotatable relative to the stator, wherein:
   the pressure chamber is annularly shaped and the planetary rolling-contact gear system is arranged radially inside the pressure chamber;
   the at least one planetary rolling body includes first toothing;
   the sleeve includes first and second radially inwardly extending protrusions;
   each of the first and second protrusions include second toothing engaged with the first toothing; and,
   the first and second protrusions are separated, in an axial direction, by a portion of the sleeve free of the second toothing.

2. The hydrostatic actuator as recited in claim 1, wherein the electric motor and the planetary rolling-contact gear system are arranged to be axially spaced apart from one another and coaxial with one another.

3. The hydrostatic actuator as recited in claim 1, wherein the housing of the master cylinder and the housing of the electric motor are of one-piece construction.

4. The hydrostatic actuator as recited in claim 1, wherein a pressure fluid reservoir is provided radially outside the pressure chamber.

5. The hydrostatic actuator as recited in claim 1, wherein the sleeve is secured to the housing such that the sleeve is fixed against rotation and axially displaceable and wherein the piston is axially displaced by the sleeve.

6. The hydrostatic actuator as recited in claim 1, wherein the hydrostatic actuator further comprises a sensor device for sensing at least a rotary movement of the gear spindle.

7. The hydrostatic actuator as recited in claim 6, wherein the sensor device detects an axial path of the piston.

8. The hydrostatic actuator as recited in claim 6, wherein the sensor device detects a pressure in the pressure chamber.

9. The hydrostatic actuator as recited in claim 6, wherein a local electronics is provided on the side of the housing of the electric motor that faces away from the master cylinder.

10. The hydrostatic actuator as recited in claim 9, wherein at least one sensor for detecting operating data of the hydrostatic actuator is arranged on a circuit board of the local electronics.

11. A hydrostatic actuator comprising:
a first housing;
a master cylinder, including:
    a second housing secured to the first housing; and,
    a piston axially displaceable in the second housing;
a planetary rolling-contact gear system including:
    a sleeve;
    a gear spindle partially disposed within the first housing and partially disposed within the second housing; and,
    at least one planetary rolling body engaged with the sleeve and the gear spindle;
an electric motor for rotating the gear spindle; and,
a pressure chamber at least partially formed by the second housing and the piston, wherein:
    a first end of the gear spindle extends past the piston in a first axial direction; and,
    a second end of the gear spindle extends past the piston in a second axial direction opposite the first axial direction.

12. A hydrostatic actuator comprising:
a first housing;
a master cylinder, including:
    a second housing secured to the first housing; and,
    a piston axially displaceable in the second housing;
a planetary rolling-contact gear system including:
    a sleeve;
    a gear spindle partially disposed within the first housing and partially disposed within the second housing; and,
    at least one planetary rolling body engaged with the sleeve and the gear spindle;
an electric motor for rotating the gear spindle; and,
a pressure chamber formed by the second housing and the piston, wherein:
    a first portion of the second housing is located radially between the sleeve and a portion of the piston; and,
    a second portion of the second housing is located radially outward of the piston.

* * * * *